United States Patent [19]

Lowry

[11] 3,778,543

[45] Dec. 11, 1973

[54] PREDICTIVE-RETROSPECTIVE METHOD FOR BANDWIDTH IMPROVEMENT

[75] Inventor: John D. Lowry, Willowdale, Ontario, Canada

[73] Assignee: Ellanin Investments Ltd., Ontario, Canada

[22] Filed: Sept. 5, 1972

[21] Appl. No.: 286,456

[52] U.S. Cl. ..... 178/5.4 R, 178/DIG. 25, 333/70 T, 328/5 S, 328/15 I

[51] Int. Cl. ..... H04n 5/14

[58] Field of Search ..... 178/DIG. 25, DIG. 34, 178/DIG. 3, DIG. 19, 5.4 R, 5.2 R; 328/55, 65, 151; 307/268; 333/70 T, 18, 20

[56] References Cited

UNITED STATES PATENTS

| | | | |
|---|---|---|---|
| 2,759,044 | 8/1956 | Oliver | 178/7.5 R |
| 2,972,109 | 2/1961 | Nicholson | 333/70 T |
| 3,209,263 | 9/1965 | Keiper | 328/5 S |
| 3,268,836 | 8/1966 | Linke | 333/20 |
| 3,292,110 | 12/1966 | Becker et al. | 330/70 T |
| 3,614,303 | 10/1971 | Krause | 178/5.4 R |

*Primary Examiner*—Robert L. Richardson
*Assistant Examiner*—Richard Maxwell
*Attorney*—Harry G. Weissenberger et al.

[57] ABSTRACT

The relatively long rise and fall time of narrow-bandwidth television chroma signals is sharply reduced by the use of a processing circuit using the corresponding luminance signal as a control. The processing circuit determines the presence of a transistion in the video signal and, through the use of delay line chains, averages the chroma signals from a plurality of preceding time points up to the center of the transition, and then switches to average the chroma signal from a plurality of subsequent time points. The thus averaged chroma signals exhibit a very rapid rise time which results in a much sharper color transition in the picture than the unprocessed video signal can produce.

10 Claims, 2 Drawing Figures

PREDICTIVE-RETROSPECTIVE METHOD FOR BANDWIDTH IMPROVEMENT

BACKGROUND OF THE INVENTION

Color information in the television art is derived from the vectorial addition and subtraction of chroma signals having certain predetermined phase relationships. In a conventional video signal, the nature of the color encoding system is such that the chroma signals (herein referred to as the I and Q signals) have a much narrower bandwidth than the luminance or Y signal, which carries the brightness information. Typically, the rise or fall time of the Q signal at a sharp transition may be 10 times as long as the rise or fall time of the corresponding Y signal.

In certain applications requiring a very high degree of picture quality, an objectionable color blur occurs on either side of a sharp edge between different-colored objects due to the inability of the narrow-bandwidth chroma signals to change fast enough. No satisfactory solution to this problem has previously been found.

SUMMARY OF THE INVENTION

The system of this invention solves the color blur problem by processing the chroma signals through a circuit controlled by the luminance signal in such a manner as to reshape the chroma signals so that their apparent bandwidth at the transition substantially equals that of the luminance signal.

The processing of the chroma signals involves using the luminance signal to locate the transition, and to average the chroma signals in opposite directions on each side of the transition (prospectively on the leading side, retrospectively on the trailing side).

An additional advantage of the averaging process is the substantial elimination of high-frequency noise from the chroma signals. Furthermore, the system can be adapted to reduce noise in the luminance signal also, and to create special visual effects by a controlled squelching of picture detail.

In color video use, the device of this invention solves an additional problem of video-recording-to-film conversion which, to the best of applicant's knowledge, has thus far defied solution. Due to the very nature of color television camera equipment, there is always some registration error, at least in some portions of the image, between the red, blue, and green image components. The circuit of this invention, by keying the chroma signal to the intensity signal, creates the visual appearance of correcting any registration error between the chroma components.

It is the object of the invention to use a high-bandwidth signal to improve the apparent bandwidth of a transitionally coincident low-bandwidth signal.

It is another object of the invention to control the averaging of a signal by another, transitionally coincident signal to prospectively average the first signal on the leading side of its transitions, and to retrospectively average it on the trailing side.

It is a further object of the invention to use controlled signal averaging to control picture detail in a video picture.

It is yet another object of the invention to use switched delay line chains for controlling the averaging of one signal by a transitionally coincident signal.

DESCRIPTION OF THE PREFERRED EMBODIMENT

Figure 2:
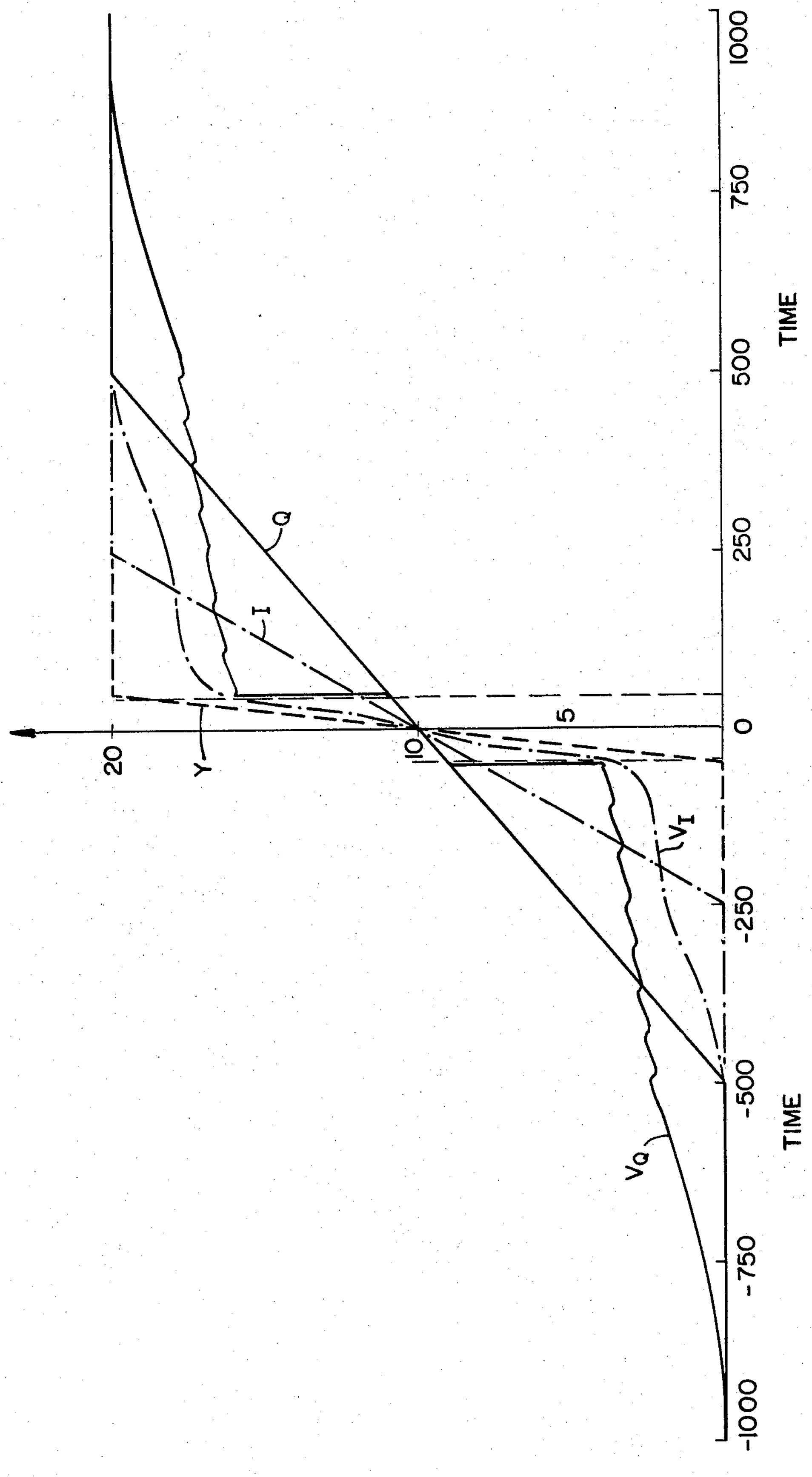
FIG. 2 is time-amplitude diagram illustrating the various signals involved in this invention.

In a conventional video signal, a sharp transition from, say, a dark blue background to a bright red object will produce transitions of the Y, I, and Q signals at the maximum rates shown in FIG. 2. Typically, the transition of the Y (luminance) signal may require about 100 ns, while the corresponding transitions of the I and Q (chroma) signals may require about 500 ns and 1,000 ns, respectively, due to their reduced bandwidth. This results in a somewhat fuzzy color transition at the edge of the object in the resulting video picture.

Figure 1:
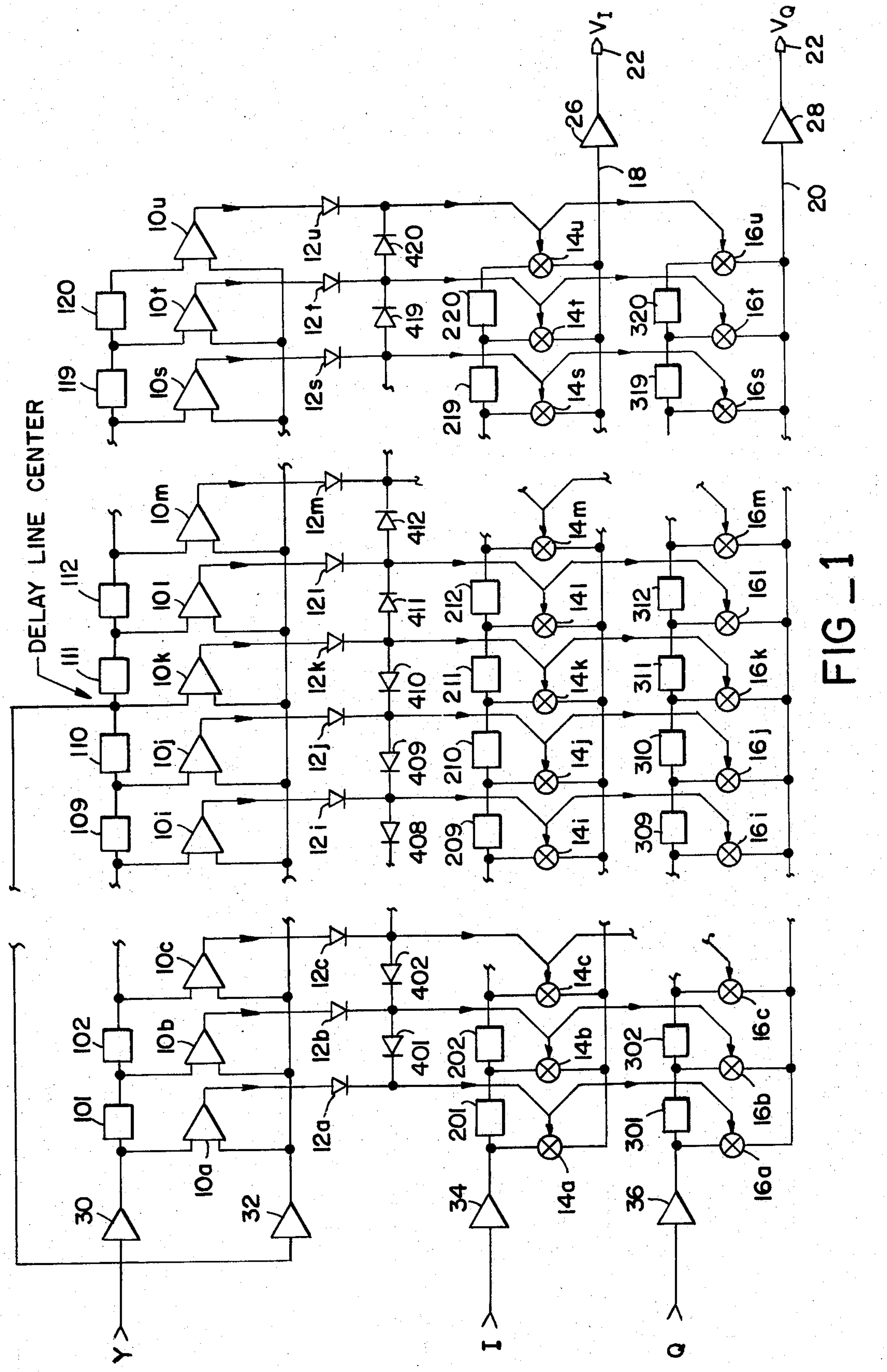
FIG. 1 is a block-type circuit diagram of the apparatus of this invention.

To overcome this problem, the device of the invention, as shown in FIG. 1, uses three delay circuit chains 101–120, 201–220, and 301–320 connected, respectively, to the Y, I, and Q signal channels. Although twenty delay circuits are used in each chain in the preferred embodiment of the invention of FIG. 1, it will be understood that more or fewer circuits may be used as the parameters of a particular application may require.

The twenty delay circuits of each chain provide twenty-one locations in each chain denoted by the suffixes *a* through *u*, *a* being the input terminal, *k* the center point, and *u* the output terminal of each chain.

Each location in the Y chain is connected to one side of a differential amplifier 10 whose other side is connected to the Y chain center point $Y_k$. The differential amplifiers 10 translate any difference (of either polarity) between their two sides into a control signal which is amplified by switch drivers 12 and applied to electronic switching gates 14, 16. The gates or switches 14, 16 are so designed as to be normally "on" or conducting in the absence of a control signal, and to gradually cut off as the difference sensed by differential amplifiers 10 goes from zero to a few percent of the maximum value of Y.

When the circuit of this invention is used for color video purposes, and no special effects are desired, the upper limit of the cut-off range is chosen so as to lie just slightly above the noise level to achieve maximum circuit effectiveness without spurious triggering by noise signals. In this manner, the circuit works not only as a color transition sharpener, but also as a noise-reducing circuit.

Diodes 401 through 420 interconnect the gate control circuits in such a manner that a control signal at any of locations a through *k* will cut off not only its own switches 14, 16, but also all those to its left in FIG. 1. Likewise, a control signal at locations *k* through *u* will cut off not only its own switches 14, 16, but also all those to its right in FIG. 1.

The output sides of gates 14, 16 are connected to I and Q output buses 18, 20, which feed into I and Q outputs 22, 24 through optional impedance matching amplifiers 26, 28. The output buses 18, 20 must feed into a high impedance for reasons discussed hereinafter. The proper DC level relationships between the various signals are assured by clamping amplifiers 30, 32, 34, 36.

The operation of the device is as follows: As long as all signals are steady, the signal voltage at all locations in the Y chain is identical to the signal voltage at the center of the Y chain, no control signals are produced, and all the switches 14, 16 are "on."

Considering now the Q bus 20 (the same is true for the I bus 18), the voltage on it is determined by the formulae for a load driven by a plurality of parallel-connected voltage sources each having an internal resistance equal to the "on" resistance of switching gates 14, 16. In accordance with Kirchhoff's Law the voltage on bus 20 is given by the formula $$V_Q = a+b+c+. . . /R+n \quad 1$$

in which $V_Q$ is the voltage on bus 20, *a, b, c,* etc., are the voltages at those of locations $Q_a$ through $Q_u$ at which the switches 16 are "on," n is the total number of switches 16 that are "on," and R is the ratio of the "on" resistance of gates 16 to the load resistance on bus 20, i.e., the input impedance of amplifier 28.

For reasonably distortion-free operation of the circuit, R must be very small with respect to Z, so that equation (1) essentially becomes $$V_Q = a+b+c+. . . /n \quad 2.$$

This is the reason why buses 18 and 20 must feed into a high impedance which may have to be provided by amplifiers 26, 28.

Assuming the transitions of Y and Q to be linear between a pre-transition steady-state value and a post-transition steady-state value 20 units higher; assuming the transition of Y to last from −50 ns to +50 ns in FIG. 2 while the transition of Q lasts from −500 ns to +500 ns in FIG. 2; and assuming each delay line of each chain to produce a 50 ns delay, the operation of the circuit during a positive transition is as follows:

Until time −1,000, all of the switches **16*a* through 16*u* are "on," and since in a steady-state condition the signal voltages a through u are all equal, the output voltage on Q bus 20 is equal to the input voltage $Q_a$. At time −950, $Q_a$ has risen by one unit, while $Q_b$ through $Q_u$ are still at the steady-state value. With all switches 16 still "on," the total voltage $V_Q$ in bus 20 is therefore up by 1/21 or approximately 0.05 units. At time −900, $Q_a$ is up to two units, $Q_b$ is up to 1 unit, and $Q_c$ through $Q_u$ are still at the steady-state level. WIth all switches 16** still "on," $V_Q$ is now at (1+2)/21 or 0.14 units above steady-state.

This progression continues until time −550, when $V_Q$ = (1+2 . . . +9)/21 or approximately 2.14 units. At this point, the rise of the Y signal begins at $Y_a$. By time −500, a sufficient difference exists between $Y_a$ and the center point connection $Y_k$ to have caused the differential amplifier **10*a* to cut off switch 16*a*. Consequently, only twenty switches 16 remain "on," and the now 11-unit signal voltage $Q_a$ is no longer transmitted to bus 20. Therefore, at time −500, $V_Q$ = (1+2 . . .+9)/20 or 2.25 units. As the increase in Y propagates through the Y delay chain, more and more switches 16** cut off, and the rise of $V_Q$ is determined no longer by an increase in the numerator of its fraction, but by a decrease in its denominator.

At time −50, eleven switches are "on," and $V_Q$ = (1+2 . . . +9) /11 or 4.09 units, i.e., about 20 percent of the total 20-unit transition. The increase in the Y signal now begins to reach location $Y_k$, and as $Y_k$ begins to exceed a predetermined threshold value, say one unit, all the switches 16 except **16*k*** cut off because $Y_k$ is now different from both the pre-transition and the post-transition steady-state values.

Consequently, at time 0, $V_Q$ = 10/1 or 10 units, which is the center value of the Q transition. Hence the centers of the Y and $V_Q$ transitions are coincident in time, as are the centers of the original Y and Q signal transitions.

When $Y_k$ rises to within the threshold value of the post-transition steady state of Y (i.e., 19 units in the example described), the signal difference which operates the differential amplifiers 10 exists only on amplifers **10*l* through 10*u*, whose Y-chain inputs the post-transition steady-state value of Y has not yet reached. Consequently, by time +50, switches 16*a* through 16*k* are "on" while switches 16*l* through 16*u*** are cut off. At time +50, $Q_a$ and $Q_b$ have reached the 20-unit post-transition steady state, while $Q_c$ is at 19 units, and so on down to $Q_k$ at 11 units. Hence $V_Q$ = 20+20+19 . . .+11)/11 or 15.9 units, representing about 80 percent of the full 20-unit transition.

As the post-transition steady-state value of Y continues to propagate through the Y delay chain, more and more of the switches 16 turn "on" again, until at time 550, all the switches 16 are "on", and $V_Q$ = (12×20+19 . . . +11)/21 or 17.8 units. At time 600, with all the switches 16 remaining "on," the Q signal further propagates to make $V_Q$ = (13×20+19...+12)/21 or 18.3 units. The change in the numerator of the $V_Q$ fraction then continues until at time + 1,000, $V_Q$ = 21 × 20/21 or the full 20-unit post-transition steady-state value to complete the transition process.

From the foregoing description, it is apparent that the device of this invention achieves its objective of shortening the chroma transition by actually lengthening the transition as a whole but shortening its concial center portion. In this respect, it must be recalled that in color video applications, the red, blue, and green chroma signal components are vectorially derived from the I and Q signals, and are then combined with the Y signal to produce the three actual color signals. Inasmuch as the Y signal is generally much larger than the chroma component signals, the 20 percent chroma change occurring in the inventive circuit before the Y transition begins and after it ends becomes considerably less significant than it would appear from FIG. 2. In addition, the human eye has a tendency to make a color change appear to coincide with a luminance change, even though it is in fact slightly off. As a result, the 20 percent chroma change essentialy becomes visually unnoticeable.

It will also be seen from the foregoing description that the components **10*k*, 12*k*, 410, 411, 14*k* and 16*k* are redundant because the output of differential amplifier 10*k* can never be anything other than zero, and the gates 14*k* and 16*k*** are always "on". Consequently, they can be replaced, if desired, by resistors having a value equal to the "on" resistance of the gates.

The above-defined $V_Q$ output curve is shown in FIG. 2, together with the straight-line approximations of the Y and Q signals on which the above computations are based. In addition, FIG. 2 shows, by way of comparison, a straight-line approximation of an I signal having a transition time of 500 ns, and the resulting $V_I$ curve on bus 18 when that signal is processed by the apparatus of FIG. 1 and smoothed by an appropriate conventional low-pass filter (not shown).

It will be noted that with the use of the inventive apparatus, approximately 60 percent of the total $V_Q$ signal change takes place in the 100 ns interval between times −50 and +50. By comparison, the unprocessed Q signal requires 600 ns to change by the same amount. The visual effect in the video picture is a slight color change on each side of the edge of the object, with the major change being sharply concentrated at the edge of the object where the corresponding sharp luminance change occurs. This is true regardless of the total amount of chroma change; hence the edge effect is as sharp for an object differing only slightly in color from the background as it is for an object having a color directly opposite to the background color.

The discontinuities in the $V_Q$ curve (which can be smoothed out by conventional filter means) are caused by the fact that the control signals produced by differential amplifiers 10 are preferably set to turn switches 14, 16 from full "on" to full "off" as the voltage differential sensed by amplifiers 10 goes from 0 to about 5 percent of the maximum amplitude of the Y signal.

The above discussion assumes the largest possible Y transition, i.e., a transition from black to maximum luminance; for lesser Y transitions, the discontinuities in the $V_Q$ curve tend to soften. If the change in luminance at the edge of the ojbect is less than the noise level, the sharpening effect of the inventive device rapidly disappears, as the switches 14, 16 can no longer fully cut off. However, important color changes normally do not occur at such a small intensity transition. In addition, the limited ability of the human eye to discern color change detail independently of intensity change detail makes the visual effect of this limitation of the inventive device insignificant.

The fact that the $V_Q$ signal is, at all times, an average of numerous Q signal increments is highly effective in reducing high-frequency noise, which tends to be particularly objectionable in the blue component of the color signal.

A potential malfunction of the device as described so far might occur if several transitions of the Y signal take place at very short intervals. For this reason, diodes 401 through 420 are provided to lock the switches 14, 16 in the "off" condition after they have been actuated (in locations *a* through *j*) or until they have been actuated (in locations *l* through *u*) in their proper sequence. In effect, the diodes 401 through 420 act as a low-pass filter for the Y signal as far as the control of the delay line chains is concerned.

Although the circuit action has been described above in terms of an ascending transition, it will be understood that the circuit functions in exactly the same manner for a descending transition (i.e., from a high-level steady state to a low-level steady state).

An interesting effect can be obtained by feeding the Y signal instead of the I or Q signal into one of the controlled chains of FIG. 1. The resulting $V_Y$ signal is generally identical to the Y signal, but by raising the cut-off threshold of the control signal, the high-frequency noise reduction effect gradually degenerates into a loss of detail which gives a live picture a cartoon-like appearance and is useful in creating special effects or in cleaning up extremely noisy pictures in which detail is of secondary importance.

What is claimed is:

1. The method of improving the transition time of a first electronic signal through the use of a second, corresponding signal having a shorter transition time, comprising the steps of:

a. sampling said first signal at a purality of points spaced in time on each side of a central time point;

b. averaging selected samples from one side of said central time point prior to the transition of said second signal, and from the other side of said central time point after said transition, to form a first-signal output; and c. using the transition of said second signal to switch the sample averaging from one side of said central time point to the other.

2. The method of claim 1, in which progressively fewer samples are averaged as the transition of said second signal approaches said central time point, and progressively more samples are averaged as the transition of said second signal recedes from said central time point.

3. Apparatus for improving the transition time of a first electronic signal through the use of a second, corresponding signal having a shorter transition time, comprising:

a. first and second chains of series-connected signal delay devices;

b. first and second electronic signals connected, respectively, to the inputs of said first and second delay chains;

c. output bus means associated with said first delay chain;

d. comparator means associated with spaced locations in said second delay chain for sensing differences between the values of said second signal at their associated locations and the value of said second signal at the center location of said second delay chain; and e. gating means connected to said comparator means so as to connect to said output bus means only those locations of said first delay chain corresponding to second-chain locations at which no substantial difference is sensed by the comparator means associated with that location.

4. The apparatus of claim 3, further comprising unidirectionally conductive means interconnecting said gating means so as to cause the blocking of one of said gating means by an associated comparator means to also cause the blocking of all other gating means associated with locations more remote from, and on the same side of, the chain center.

5. The apparatus of claim 3, in which said first and second signals are identical.

6. Apparatus for improving the transition time of the low-bandwidth chroma components of video signals with the aid of the corresponding luminance component of the video signal, comprising:

a. first and second chains of series-connected delay lines defining a plurality of locations along the chain, each location on one chain corresponding to a location on the other;

b. means for applying a chroma component of the video signal to the input of said first chain, and the corresponding luminance component to the input of the second chain;

c. differential amplifier means connected to each location on said luminance chain and to the center of said luminance chain, each of said amplifier means being responsive to a difference between the luminance component value at its location and the luminance component value at the center of the luminance chain to produce a control signal;

d. output bus means associated with said chroma chain; and e. gating means connected between each location of the chroma chain and said output bus means, each gating means being arranged to interconnect its chroma chain location and said output bus means when the control signal produced by the differential amplifier means at the corresponding location in the luminance chain is less than a predetermined threshold value.

7. Apparatus according to claim 6, further including diode means connected between said gating means and oriented so that the blocking of any one of said gating means by a control signal also causes the blocking of all other gating means associated with locations more remote from, and on the same side of, the chain center.

8. Apparatus according to claim 6, in which there are two chroma chains, each with its own output bus and its own set of gating means; each of said chroma chains being supplied with one subcomponent of the chroma component of the video signal, and both sets of gating means being operated by the same control signals.

9. Apparatus according to claim 6, in which said output bus means feed into an impedance very high with respect to the "on" resistance of said gating means.

10. The method of visually correcting color misregistration in a scanned video image, comprising the steps of:

a. sampling the chroma components of the image at a plurality of points spaced in time on each side of a central time point;

b. detecting transitions of the intensity component of the image at said central time point;

c. averaging selected samples from one side of said central time point prior to the transition of said intensity component, and from the other side of said central time point after said transition, to form chroma-component outputs; and d. using the transition of said intensity component to switch the sample averaging from one side of said central time point to the other.

* * * * *